(12) United States Patent
Ogo

(10) Patent No.: US 10,562,354 B2
(45) Date of Patent: Feb. 18, 2020

(54) MOTORCYCLE TIRE FOR RUNNING ON ROUGH TERRAIN

(71) Applicant: Sumitomo Rubber Industries, Ltd., Kobe-shi, Hyogo (JP)

(72) Inventor: Kanako Ogo, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 48 days.

(21) Appl. No.: 15/003,910

(22) Filed: Jan. 22, 2016

(65) Prior Publication Data

US 2016/0214439 A1 Jul. 28, 2016

(30) Foreign Application Priority Data

Jan. 26, 2015 (JP) .................................. 2015-012391

(51) Int. Cl.
| | |
|---|---|
| *B60C 11/11* | (2006.01) |
| *B60C 11/13* | (2006.01) |
| *B60C 11/03* | (2006.01) |

(52) U.S. Cl.
CPC .............. *B60C 11/11* (2013.01); *B60C 11/033* (2013.01); *B60C 11/1369* (2013.01);
(Continued)

(58) Field of Classification Search
CPC ................................ B60C 11/11; B60C 11/033
See application file for complete search history.

(56) References Cited

U.S. PATENT DOCUMENTS

| | | | | |
|---|---|---|---|---|
| 4,425,954 A | * | 1/1984 | Ogren ................... | B60C 25/025 157/1.22 |
| 9,290,063 B2 | * | 3/2016 | Hikita ................. | B60C 15/0603 |

(Continued)

FOREIGN PATENT DOCUMENTS

| | | |
|---|---|---|
| EP | 2412546 A1 | 2/2012 |
| EP | 2529954 A1 | 12/2012 |

(Continued)

OTHER PUBLICATIONS

Extended European Search Report dated Jun. 23, 2016, for European Application No. 16151773.5.

*Primary Examiner* — Matthew J Daniels
*Assistant Examiner* — Nicholas R Krasnow
(74) *Attorney, Agent, or Firm* — Birch, Stewart, Kolasch & Birch, LLP

(57) ABSTRACT

A motorcycle tire for running on rough terrain, the tire includes a tread portion including a central region, a pair of shoulder regions and a middle region. The tread portion is provided with at least one central block with a ground contact face whose centroid is located within the central region, at least one shoulder block with a ground contact face whose centroid is located within the shoulder region on each side of a tire equator, and at least one middle block with a ground contact face whose centroid is located within the middle region on each side of the tire equator. When the respective blocks are projected onto a tire meridian cross section along a circumferential direction of the tire, every pair of axially adjacent two blocks are arranged so as to overlap one another at least partially on the tire meridian cross section.

8 Claims, 11 Drawing Sheets

(52) U.S. Cl.
CPC ...... *B60C 11/1376* (2013.01); *B60C 2200/10* (2013.01); *B60C 2200/14* (2013.01)

(56) References Cited

U.S. PATENT DOCUMENTS

| | | | | |
|---|---|---|---|---|
| D755,113 S | * | 5/2016 | Maeda | D12/536 |
| 9,724,969 B2 | * | 8/2017 | Oba | B60C 11/11 |
| 2006/0027296 A1 | * | 2/2006 | Tsubono | B60C 11/00 152/209.18 |
| 2008/0110541 A1 | * | 5/2008 | Sueishi | B60C 11/00 152/209.11 |
| 2008/0245457 A1 | * | 10/2008 | Sueishi | B60C 11/11 152/209.11 |
| 2010/0319826 A1 | * | 12/2010 | Idei | B60C 11/11 152/209.15 |
| 2012/0024443 A1 | * | 2/2012 | Ishida | B60C 11/11 152/209.18 |
| 2012/0048436 A1 | * | 3/2012 | Matsumura | B60C 11/11 152/209.1 |
| 2012/0160381 A1 | * | 6/2012 | Ishida | B60C 11/11 152/209.11 |
| 2012/0305154 A1 | * | 12/2012 | Hikita | B60C 11/11 152/209.11 |
| 2013/0014868 A1 | * | 1/2013 | Ishida | B60C 11/11 152/209.11 |
| 2013/0087261 A1 | * | 4/2013 | Kageyama | B60C 11/1218 152/209.8 |
| 2013/0167992 A1 | * | 7/2013 | Hikita | B60C 11/00 152/209.1 |
| 2013/0284333 A1 | * | 10/2013 | Ishida | B60C 11/11 152/209.18 |
| 2013/0306207 A1 | * | 11/2013 | Matsumura | B60C 11/11 152/209.15 |
| 2014/0209227 A1 | * | 7/2014 | Maeda | B60C 11/11 152/209.22 |
| 2014/0318675 A1 | * | 10/2014 | Chen | B60C 11/11 152/209.1 |
| 2015/0165826 A1 | * | 6/2015 | Oba | B60C 11/11 152/209.11 |
| 2016/0089939 A1 | * | 3/2016 | Oji | B60C 5/12 152/209.18 |
| 2016/0214439 A1 | * | 7/2016 | Ogo | B60C 11/11 |

FOREIGN PATENT DOCUMENTS

| | | | | |
|---|---|---|---|---|
| EP | 2789478 A1 | * | 10/2014 | ........ B60C 11/0302 |
| EP | 2965926 A1 | | 1/2016 | |
| JP | 2004306843 A | * | 11/2004 | |
| JP | 2014-141163 A | | 8/2014 | |

* cited by examiner

MOTORCYCLE TIRE FOR RUNNING ON ROUGH TERRAIN

BACKGROUND OF THE INVENTION

Field of the Invention

The present invention relates to motorcycle tires for running on rough terrain, and in particular, relates to a motorcycle tire having an improved tread block arrangement.

Description of the Related Art

Motorcycle tires for running on rough terrain which is used in motocross or the like include a tread portion provided with a plurality of tread blocks. Such a tire can obtain grip or traction since tread blocks bite in the ground.

Japanese Unexamined Patent Application Publication No. 2014-141163 discloses a motorcycle tire for running on rough terrain which includes a tread portion provided with a plurality of blocks arranged on the respective central, middle and shoulder regions. Furthermore, each land ratio of each region is defined in a certain range.

Unfortunately, when the respective tread blocks are projected onto a tire meridian cross section along a circumferential direction of the tire, axially adjacent two blocks are arranged so as not to overlap one another on the tire meridian cross section, in the tread block arrangement of the tire disclosed by the publication. Accordingly, such a block arrangement of the tire may deteriorate transient characteristic of cornering, since undesirable situation where no tread blocks come into contact with a road during cornering with a certain camber angle may happen.

SUMMARY OF THE INVENTION

In view of the above problems in the conventional art, the present invention has an object to provide a motorcycle tire for running on rough terrain having an improved tread block arrangement to offer an excellent transient characteristic of cornering.

According to one aspect of the present invention, a motorcycle tire for running on rough terrain, the tire includes a tread portion including a central region having a development width of one third of a tread development width, a pair of shoulder regions each having a development width of one sixth of the tread development width from each tread edge, and a middle region defined between the central region and one of the shoulder regions on each side of a tire equator. The tread portion is provided with at least one central block having a ground contact face whose centroid is located within the central region, at least one shoulder block having a ground contact face whose centroid is located within the shoulder region on each side of the tire equator, and at least one middle block having a ground contact face whose centroid is located within the middle region on each side of the tire equator. When the respective blocks are projected onto a tire meridian cross section along a circumferential direction of the tire, every pair of axially adjacent two blocks are arranged so as to overlap one another at least partially on the tire meridian cross section.

In another aspect of the invention, the adjacent two blocks on the tire meridian cross section may be arranged so as to overlap one another at the respective ground contact faces at least partially.

In another aspect of the invention, said at least one shoulder block may include an outer shoulder block forming one of the tread edges and an inner shoulder block which partially overlaps both of the outer shoulder block and the middle block on the tire meridian cross section, and an overlap amount between the inner shoulder block and the outer shoulder block may be greater than an overlap amount between the inner shoulder block and the middle block.

In another aspect of the invention, the tread portion may include a triangular arrangement of blocks which includes two outer shoulder blocks arranged separately in the circumferential direction of the tire to form a circumferential gap therebetween, and the middle block arranged axially inward of the gap. Each outer shoulder block may have an axial width gradually decreasing toward the gap. Tie-bars arranged in a triangular manner to connect the triangular arrangement of blocks may be provided.

In another aspect of the invention, the outer shoulder block may have the ground contact face having a circumferential length gradually decreasing axially inwardly.

In another aspect of the invention, the outer shoulder block may have the ground contact face having a circumferential length gradually decreasing axially inwardly.

In another aspect of the invention, said at least one shoulder block may include a dented shoulder block having an axially inner sidewall which is dented.

In another aspect of the invention, a land ratio of the central region may be in a range of from 11% to 15%, each land ratio of each middle region may be 2 to 5 percentage points greater than the land ratio of the central region, and each land ratio of each shoulder region may be 8 to 11 percentage point greater than the land ratio of the central region and 5 to 7 percentage points greater than the land ratio of each middle region.

In another aspect of the invention, a land ratio of the entire tread portion may be in a range of from 14% to 21%.

DESCRIPTION OF THE EMBODIMENTS

An embodiment of the present invention will be explained below with reference to the accompanying drawings.

Figure 1:
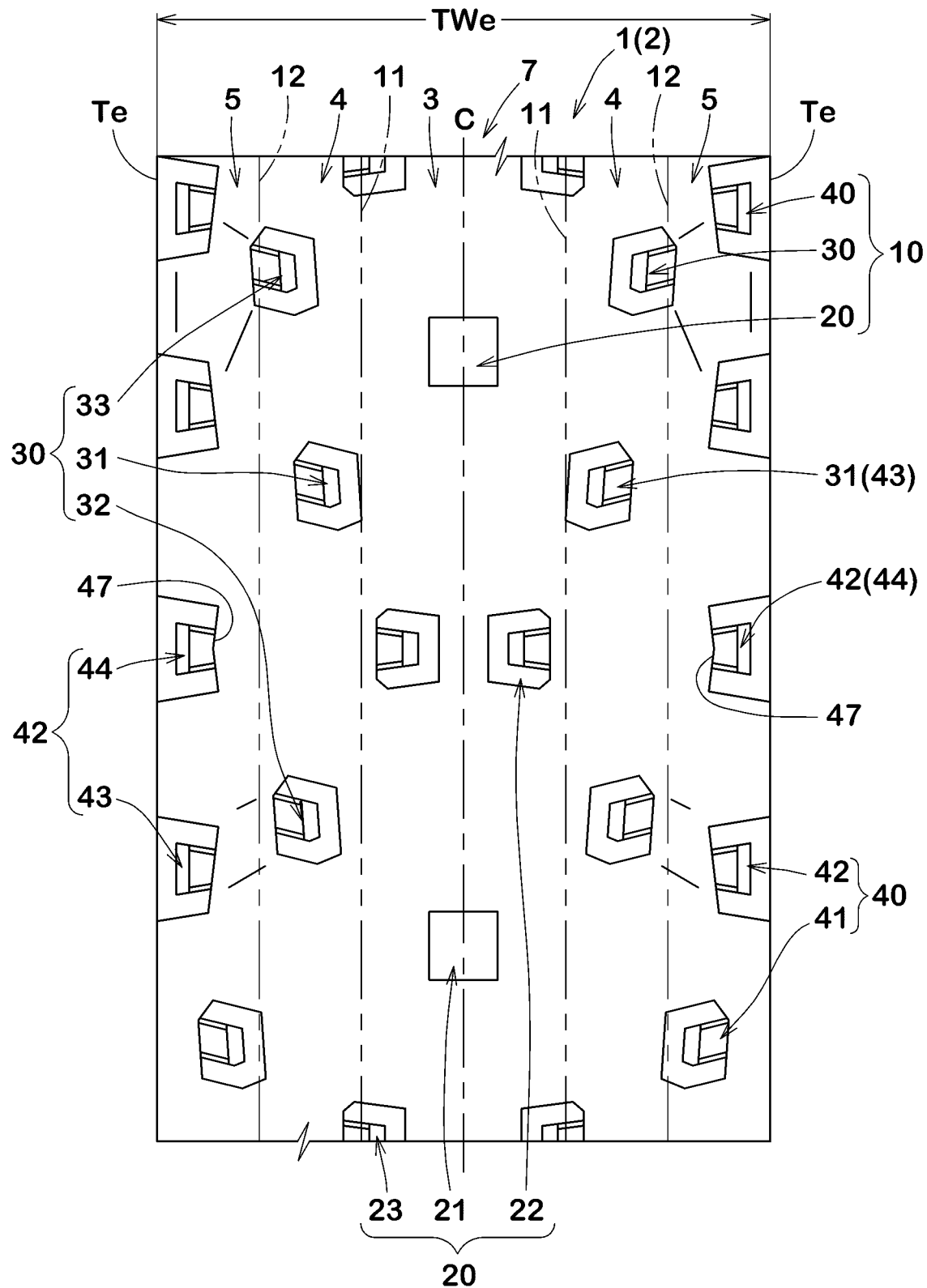
FIG. 1 is a development view of a tread portion of a motorcycle tire for running on rough terrain according to an embodiment of the present invention.

FIG. 1 illustrates a development view of a tread portion 2 of a motorcycle tire 1 for running on rough terrain according to an embodiment of the present invention. The tire 1 according to the embodiment of the present invention may preferably be embodied as a tire for motocross race, for example.

The tread portion 2 of the tire in accordance with the present embodiment is smoothly curved in an arc manner (not shown) so as to protrude radially outwardly in a tire meridian cross section including the tire axis. FIG. 1 illustrates a development shape of the curved tread portion 2. In this embodiment, the tire 1 includes a tread pattern including a plurality of circumferentially repeated design units or block groups 7 illustrated in FIG. 1.

As illustrated in FIG. 1, the tread portion 2 includes a central region 3, a pair of middle regions 4 and a pair of shoulder regions 5. The respective regions 3, 4 and 5 are provided with at least one, preferably a plurality of blocks 10. Note that each ground contact face of each block 10 is illustrated in FIG. 1. The tread pattern in accordance with the present embodiment is designed in substantially symmetrical block arrangements with respect to the tire equator C. However, note that the present invention is not particularly limited to this aspect.

The central region 3 is a region having a development width of one third of a tread development width TWe with a center corresponding to the tire equator C. Here, the tread development width TWe is a distance between tread edges Te and Te measured along a plane when the tread portion 2 is developed in the plane. Each of the tread edges Te is an axially outermost edge of a block disposed axially outermost in the blocks 10 on the tread portion 2 on each side of the tire equator C.

Each of the shoulder regions 5 is a region having a development width of one sixth of the tread development width TWe from each tread edge Te toward the tire equator C.

Each of the middle regions 4 is a region between the central region 3 and the shoulder region 5 on each side of the tire equator C.

The blocks 10 include at least one central block 20, at least one middle block 30 and at least one shoulder block 40.

The central block 20 has a ground contact face whose centroid is located within the central region 3. The middle block 30 has a ground contact face whose centroid is located within the middle region 4. The shoulder block 40 has a ground contact face whose centroid is located within the shoulder region 5.

Figure 2:
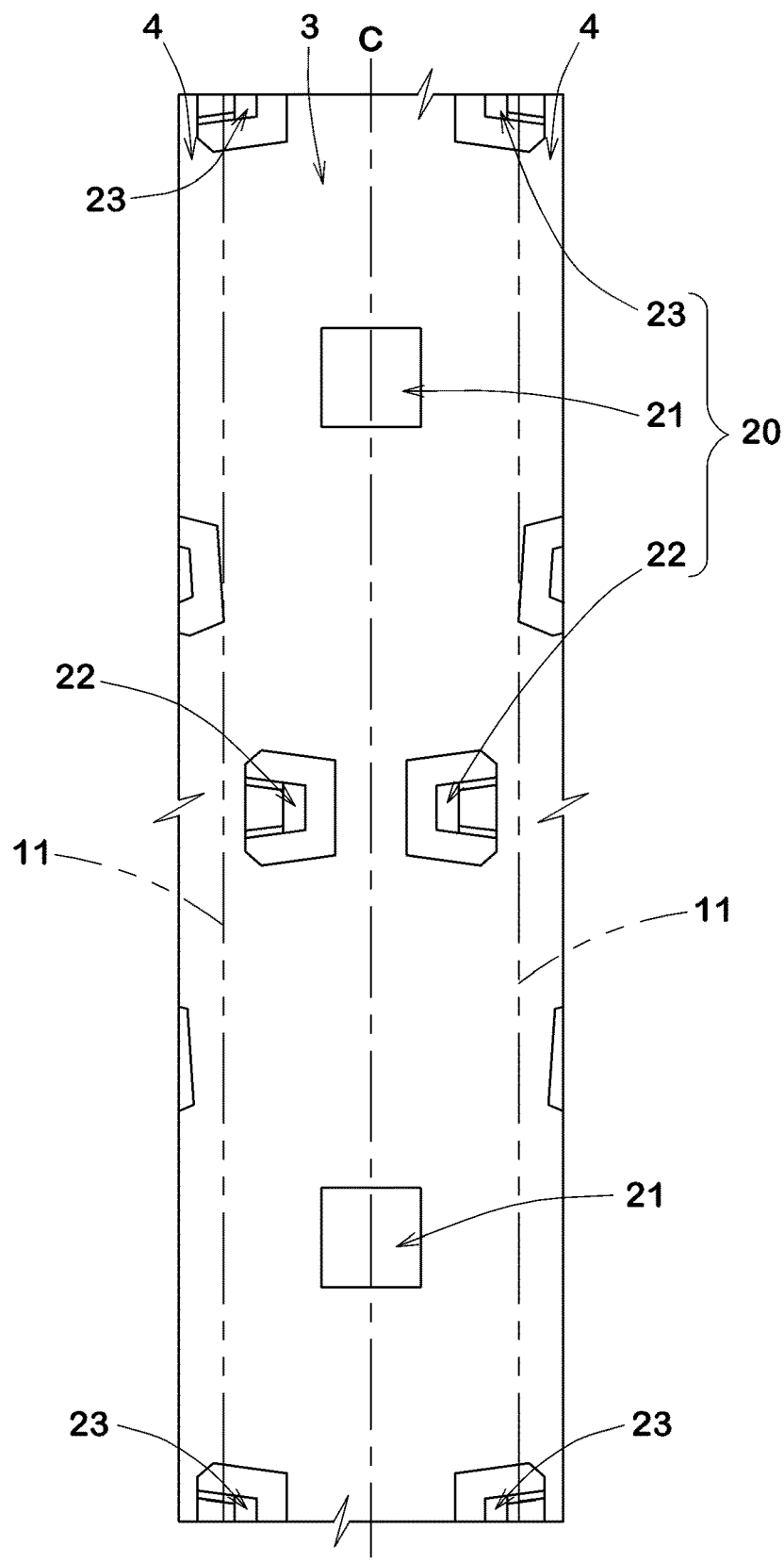
FIG. 2 is an enlarged view of a central region of the tread portion illustrated in FIG. 1.

FIG. 2 illustrates an enlarged view of the central region 3. As illustrated in FIG. 2, the at least one central block 20 includes a first central block 21, a second central block 22 and a third central block 23. The respective centroids of the central blocks 20 are positioned in different places so that the centroids thereof are located axially outwardly in order from the first central block 21, the second central block 22 and the third central block 23.

The first central block 21, for example, is arranged on the tire equator C. The first central block 21, for example, is arranged so that the entire of the block is within the central region 3 without crossing the first boundary 11 between the central region 3 and the middle region 4.

The second central block 22, for example, is arranged so that its ground contact face is between the first boundary 11 and the tire equator C without crossing both of the first boundary 11 and the tire equator C. The second central block 22 is located in a slightly outward position in the axial direction of the tire with respect to the first central block 21. In this embodiment, the second central block 22, for example, is arranged so as to overlap with the first central block 21 at least partially when the first central block 21 and the second central block 22 are projected onto an arbitrary tire meridian cross section along the circumferential direction of the tire.

Figure 3A:
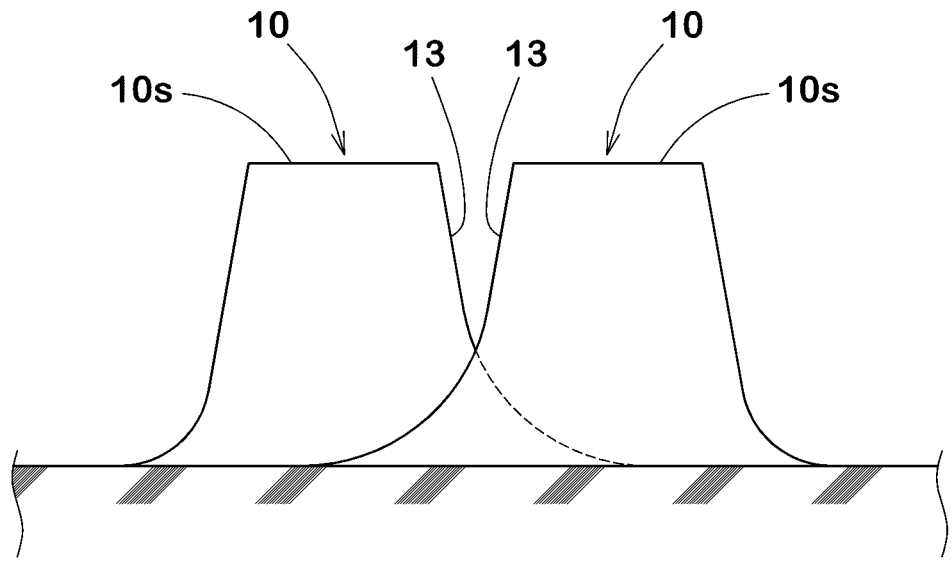
FIGS. 3A and 3B are projection views of axially adjacent blocks overlapping one another.
Figure 3B:
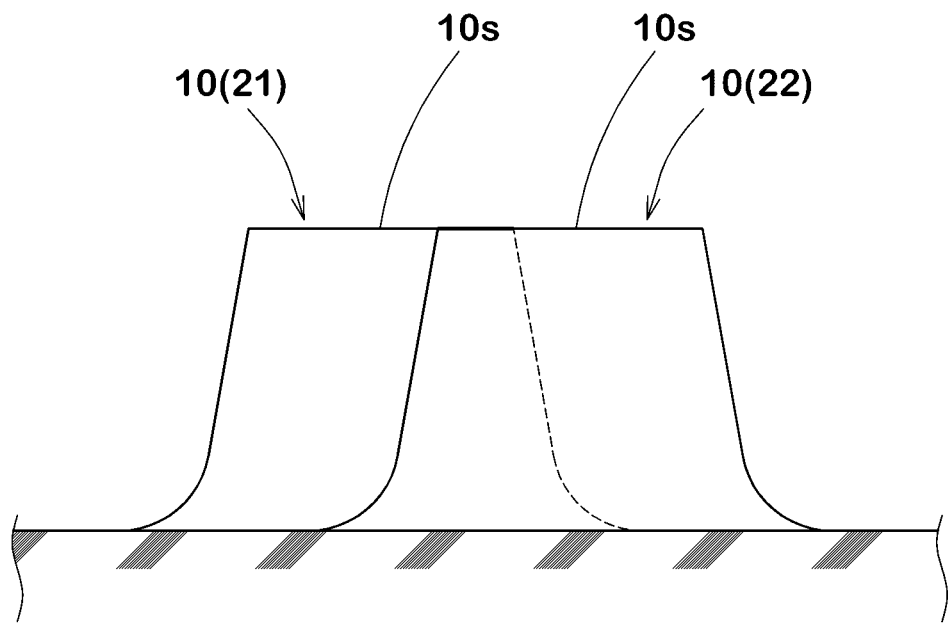

FIGS. 3A and 3B illustrate projection views of axially adjacent blocks overlapping one another on the tire meridian cross section. In this disclosure, two overlapping blocks should be understood so as to include these aspects illustrated in FIGS. 3A and 3B. In FIG. 3A, two blocks 10 are overlapped one another at least partially at the respective sidewalls 13 of the blocks. However, the respective ground contact faces 10s are not overlapped one another. Alternatively, in FIG. 3B, two blocks 10 are overlapped one another at least partially at the respective ground contact faces 10s. In this embodiment, the first central block 21 and the second central block 22 are overlapped at the respective ground contact faces 10s on the tire meridian cross section as illustrated in FIG. 3B.

As illustrated in FIG. 2, the third central block 23, for example, is arranged so as to cross the first boundary 11 between the central region 3 and the middle region 4. Furthermore, the third central block 23 is arranged so as to overlap with the second central block 22 at least partially when both blocks 22 and 23 are projected onto a tire meridian cross section along the circumferential direction of the tire.

Figure 4:
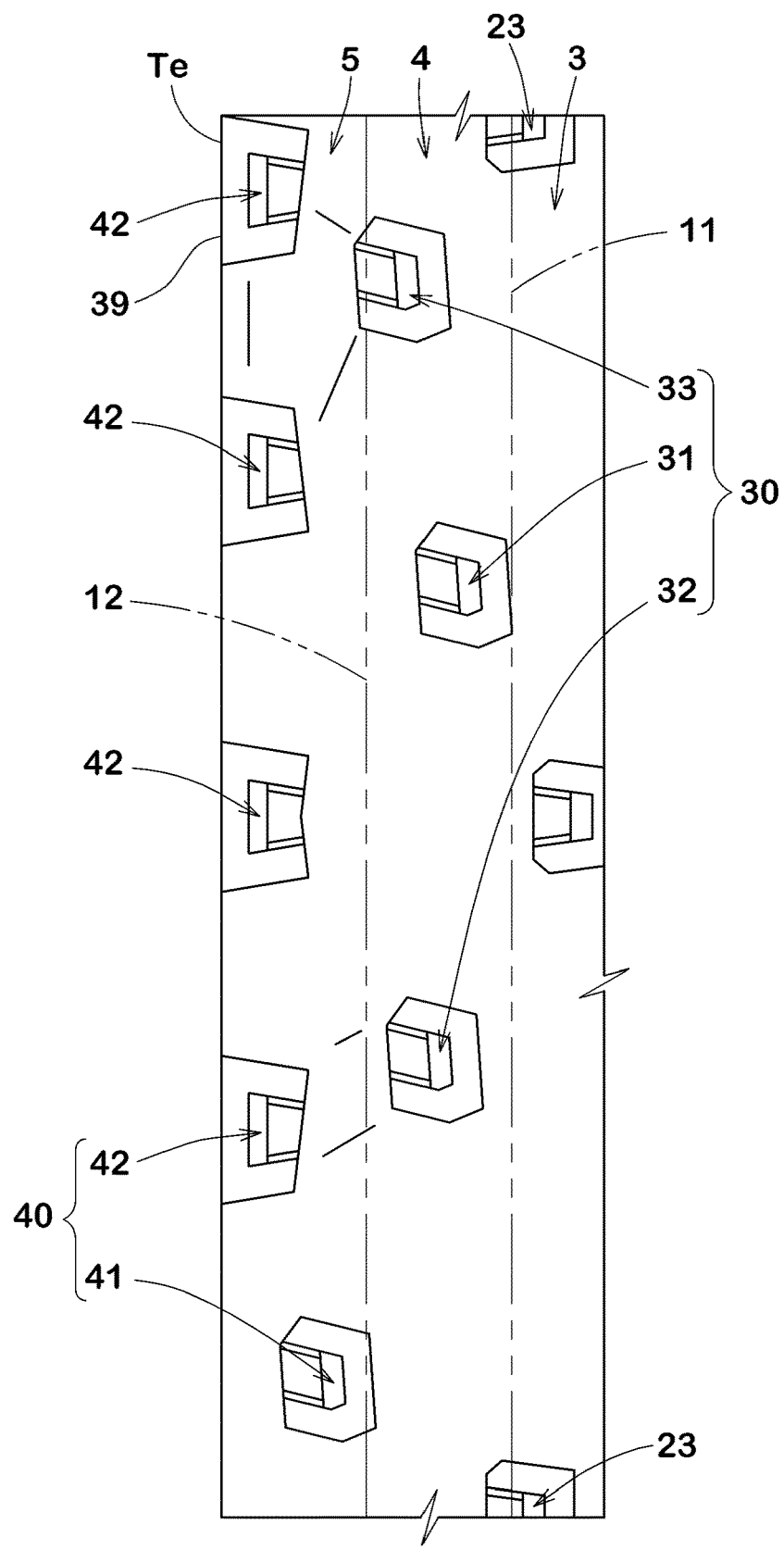
FIG. 4 is an enlarged view of a middle region and a shoulder region of the tread portion illustrated in FIG. 1.

FIG. 4 is an enlarged view of the middle region 4 and the shoulder region 5. As illustrated in FIG. 4, the at least one middle block 30 includes a first middle block 31, a second middle block 32 and a third middle block 33. The respective centroids of the middle blocks 30 are positioned in different places so that the centroids thereof are located axially outwardly in order from the first middle block 31, the second middle block 32 and the third middle block 33.

The first middle block 31 is an axially innermost block in the middle blocks 30. In this embodiment, the first middle block 31, for example, is arranged proximate to the first boundary 11 between the central region 3 and the middle region 4. Furthermore, the first middle block 31 is arranged so as to overlap with the third central block 23 when the both blocks 31 and 23 are projected onto a tire meridian cross section along the circumferential direction of the tire.

The second middle block 32 is located between the first boundary 11 and the second boundary 12 between the middle region 4 and the shoulder region 5. Furthermore, the second middle block 32 is arranged so as to overlap with the first middle block 31 at least partially when the both blocks 31 and 32 are projected onto a tire meridian cross section along the circumferential direction of the tire.

The third middle block 33 is located so as to cross the second boundary 12. Furthermore, the third middle block 33 is arranged so as to overlap with the second middle block 32 at least partially when the both blocks 32 and 33 are projected onto a tire meridian cross section along the circumferential direction of the tire. In addition, the third middle block 33 is arranged so as to overlap with the first middle block 31 at least partially when the both blocks 31 and 33 are projected onto a tire meridian cross section.

The at least one shoulder block 40, for example, includes an inner shoulder block 41 arranged axially inwardly in the shoulder region 5 and an outer shoulder block 42 arranged axially outwardly in the shoulder region 5. Namely, the centroid of the ground contact face of the outer shoulder block 42 is positioned axially outward of the centroid of the ground contact face of the inner shoulder block 41.

In this embodiment, the inner shoulder block 41, for example, is arranged so as to cross the second boundary 12. Furthermore, the inner shoulder block 41 is arranged so as to overlap with the third middle block 33 at least partially when the both blocks 41 and 33 are projected onto a tire meridian cross section along the circumferential direction of the tire.

The outer shoulder block 42, for example, is arranged without crossing the second boundary 12, and the axially outer edge 39 of the ground contact face of the outer shoulder block 42 forms the tread edge Te. Furthermore, the outer shoulder block 42 is arranged so as to overlap with the inner shoulder block 41 at least partially when the both blocks 42 and 41 are projected onto a tire meridian cross section along the circumferential direction of the tire.

Figure 5:
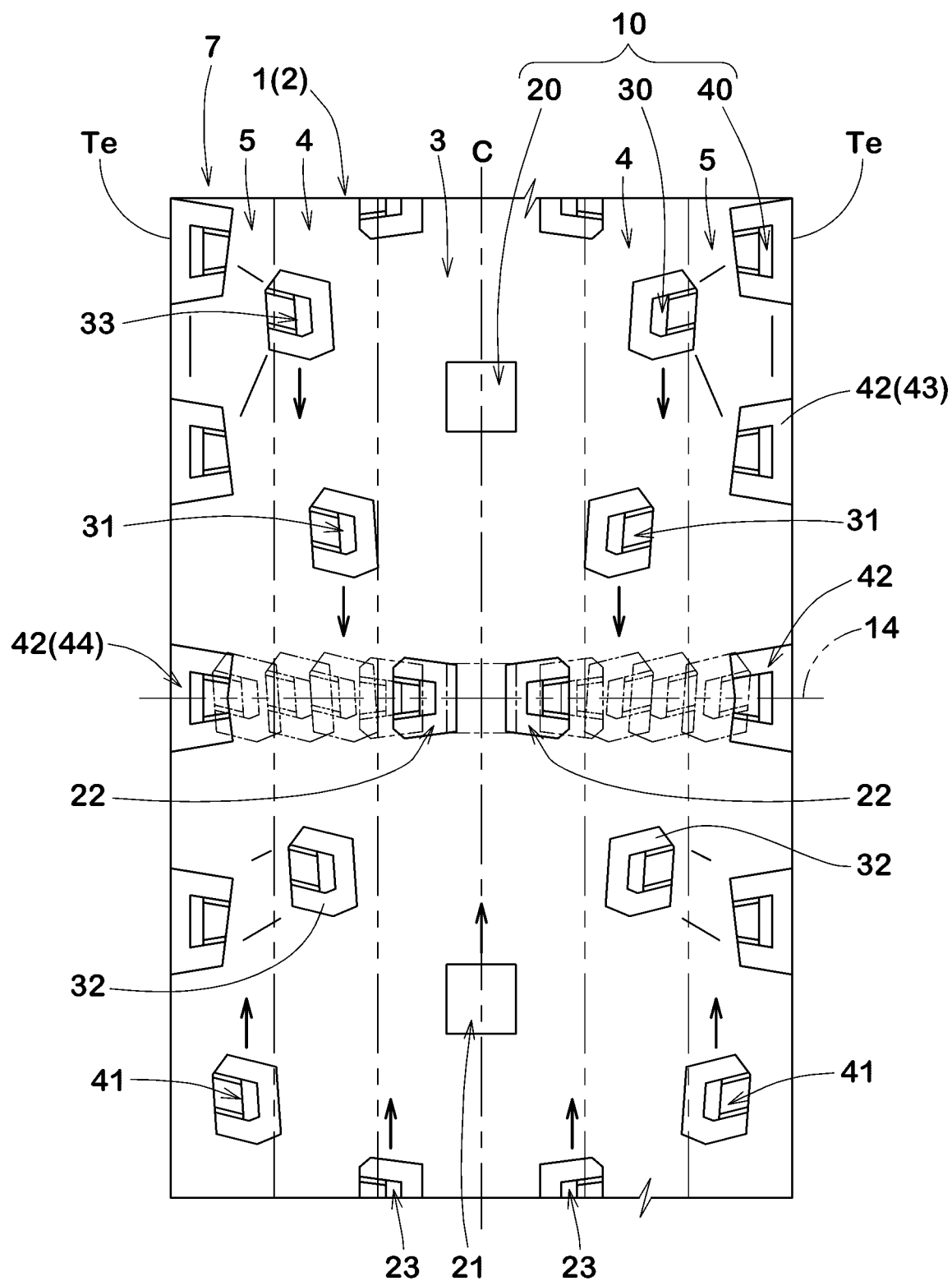
FIG. 5 is a development view of the tread portion illustrating the relationship between actual blocks and virtual blocks which are projected onto a tire meridian cross section.

FIG. 5 is a development view of the tread portion 2 illustrating the relationship between the tangible blocks 10 and virtual blocks thereof projected onto a tire meridian cross section 14. Specifically, the first central block 21, the third central blocks 23, the first middle blocks 31, the third middle blocks 33 and the inner shoulder blocks 41 are projected onto the same tire meridian cross section 14 which passes the actual second central blocks 22 and 22, and the actual outer shoulder blocks 42 and 42. In FIG. 5, the respective outline shapes of the projected blocks are illustrated using two-dotted lines.

As illustrated in FIG. 5, every pair of axially adjacent two blocks 10 overlap one another at least partially on the tire meridian cross section 14 when the respective blocks 10 are projected onto the same tire meridian cross section 14 along the circumferential direction of the tire. Accordingly, the tire 1 in accordance with the present embodiment has no region where the block 10 does not exist in the entire circumference of the tire.

In general, when the motorcycle tire for running on rough terrain is cornering with varying camber angle, the ground contact patch of the tread portion also varies between the center region 3 and the shoulder region 5. The tire 1 in accordance with the present embodiment may come into contact with the road using either one of the blocks 10 with an axially extending edge during cornering at a camber angle since axially adjacent two blocks 10 are arranged so as to overlap one another at least partially on the tire meridian cross section 14. Accordingly, the tire 1 in accordance with the present embodiment may offer high traction or grip during straight running as well as cornering at any camber angles. Furthermore, the tire 1 in accordance with the present embodiment may also offer excellent and stable transient characteristic when cornering as compared with conventional motorcycle tires.

In order to further improve the advantageous effects, the entire tread pattern design is preferably configured to have the above mentioned block groups 7 arranged repeatedly in the circumferential direction of the tire.

Figure 6:
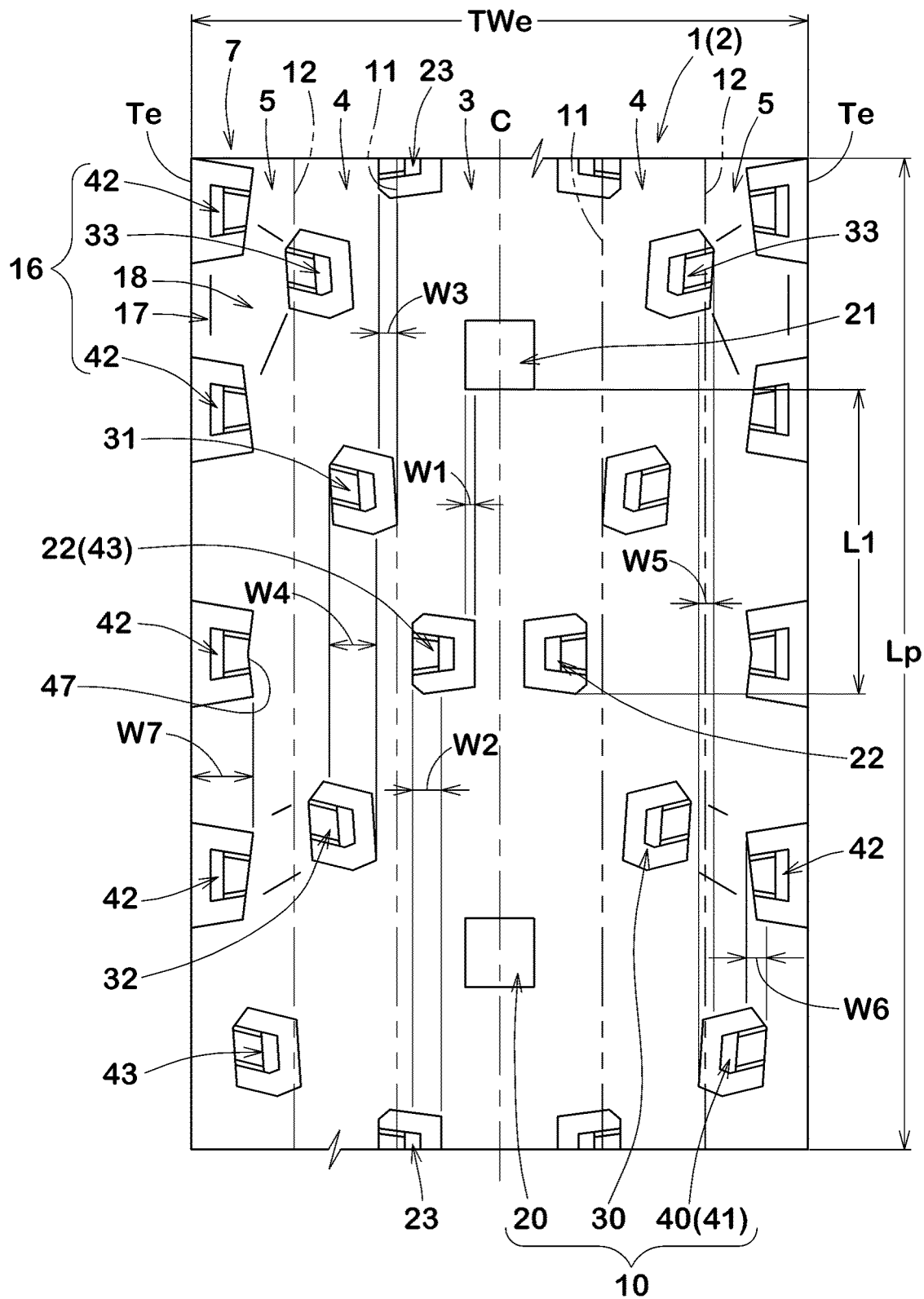
FIG. 6 is a development view of the tread portion illustrating overlapping width between axially adjacent blocks.

FIG. 6 is a development view of the tread portion 2 illustrating the respective overlapping widths between axially adjacent blocks 10. As illustrated in FIG. 6, the overlapping width W2 between the second central block 22 and the third central block 23, for example, is preferably greater than the overlapping width W1 between the first central block 21 and the second central block 22 in order to stabilize the transient characteristic when cornering at a small camber angle.

In the same point of view, the overlapping width W4 between the first middle block 31 and the second middle block 32 is preferably greater than the overlapping width W3 between the first middle block 31 and the third central block 23.

Furthermore, the overlapping width W6 between the inner shoulder block 41 and the outer shoulder block 42 is preferably greater than the overlapping width W5 between the inner shoulder block 41 and the third middle block 33 in order to stabilize the transient characteristic when cornering at a large camber angle.

In addition, the overlapping width W4 between the first middle block 31 and the second middle block 32 is preferably greater than the overlapping width W1 between the first central block 21 and the second central block 22. Such a block arrangement, for example, may provide a linear transient characteristic from straight running to the maximum leaning in cornering.

The overlapping widths of blocks 10 are not particularly limited, but are preferably in a range of from 1% to 10% the tread development width TWe.

Preferably, the circumferential length L1 between the first central block 21 and the second central block 22 is set in a range of not less than 0.25 times, more preferably not less than 0.30 times, but preferably not more than 0.40 times, more preferably not more than 0.35 times the pitch length Lp of the block groups 7. Such an arrangement of the first central block 21 and the second central block 22 may offer excellent grip performance not only on a relatively hard soil ground but also on soft mud ground.

Preferably, the tread portion 2 further includes a triangular arrangement of blocks 16. The blocks 16 include two outer shoulder blocks 42 and 42 arranged separately in the circumferential direction of the tire to form a circumferential gap 17 therebetween, and one third middle block 33 arranged axially inward of the gap 17. The triangular arrangement of blocks 16 may hold mud or soil therein effectively to enhance grip performance on soft ground.

In order to further improve the advantageous effects, each outer shoulder block 42 preferably has an axial width gradually decreasing toward the gap 17. When the tire is laterally sliding on the ground at cornering, mud and/or soil on captured in the gap 17 may be compressed strongly and sheared by the blocks 16 to generate large traction on cornering.

Preferably, tie-bars 18 are provided in a triangular manner to connect the triangular arrangement blocks 16. Each tie-bar 18 is provided by raising its groove bottom. The respective tie-bars 18 may enhance rigidity of the blocks connected one another and prevent clogging mud thereto.

In each block 10, any shapes and configurations may be employed. In this embodiment, each block 10 except the first central blocks 21 is configured as a grooved block 43 having a groove on its ground contact face.

Figure 7A:
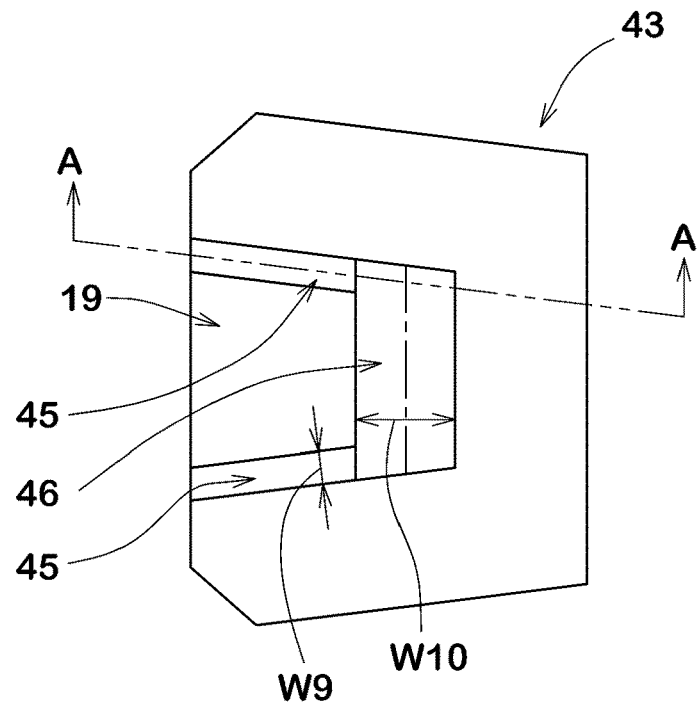
FIG. 7A is an enlarged view of a ground contact face of a grooved block.

FIG. 7A illustrates an enlarged view of the ground contact face of the grooved block 43. As illustrated in FIG. 7A, the grooved block 43, for example, is provided with a pair of axially extending first grooves 45 and 45, and a second groove 46 communicating between the first grooves 45 and 45 to define an internal block piece 19. The respective first and second grooves 45 and 46 may increase the length of edge components on the ground contact face of the block so as to improve grip on hard terrain.

In this embodiment, the second groove 46, for example, has the width W10 greater than the width W9 of the first grooves 45. Thus, the internal block piece 19 tends to deform or move easily in the axial direction during traveling. This movement of the internal block piece 19 may be useful as a self cleaning feature of the grooves so as to push away the mud clogged in the grooves 45 and 46.

Figure 7B:
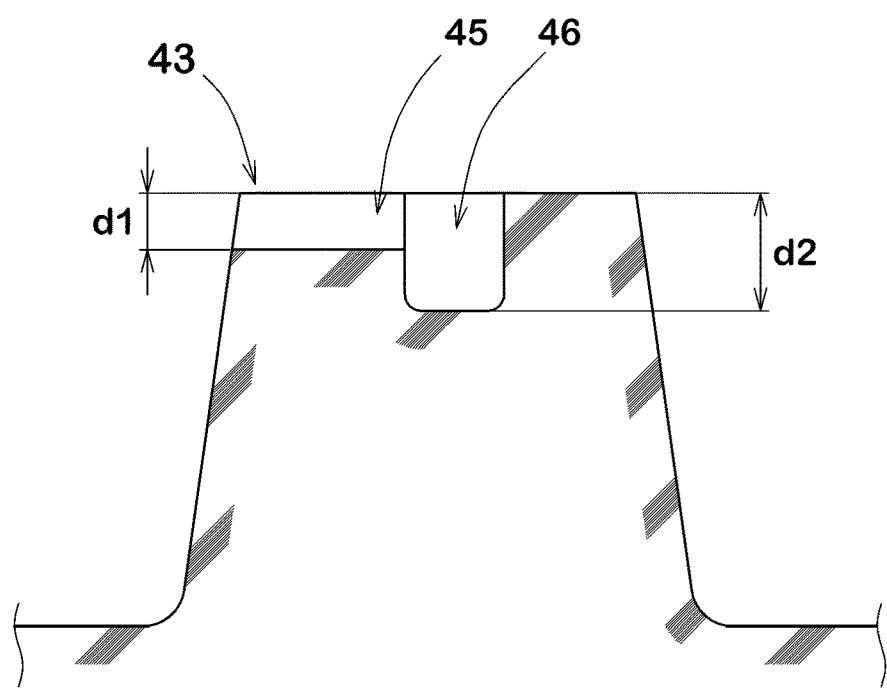
FIG. 7B is a cross-sectional view of the grooved block taken along a line A-A of FIG. 7A.

FIG. 7B illustrates a cross-sectional view of the grooved block 43 taken along a line A-A of FIG. 7A. As illustrated in FIG. 7B, the depth d2 of the second groove 46 is preferably greater than the depth d1 of the first groove 45 in order to further improve the above advantageous effect.

As illustrated in FIG. 1, the outer shoulder block 42 formed as the grooved block 43 preferably has the ground contact face having a circumferential length gradually decreasing axially inwardly. The outer shoulder block 42 may improve traction on soft mud terrain by pushing away the mud.

The outer shoulder blocks 42 also include a dented shoulder block 44 having an axially inner sidewall 47 which is dented. The dented shoulder block 44 may scoop mud in the dented inner sidewall 47 to improve grip performance during cornering on mud terrain.

In order to improve grip performance on various ground conditions, the land ratio Lt of the entire tread portion 2 is preferably in a range of not less than 14%, more preferably not less than 16%, but preferably not more than 21%, more preferably not more than 19%. Here, the land ratio is a ratio of a net ground contacting area Sb to a gross ground contacting area St of the tread portion 2 which is obtained by plugging up the all grooves.

Preferably, the land ratio Lc of the central region 3 is in a range of not less than 11%, more preferably not less than 12%, but preferably not more than 15%, more preferably not more than 14% in order to improve grip performance on hard and soft terrain.

Preferably, each land portion Lm of each middle region 4 is 2 to 5 percentage points, more preferably 3 to 4 percentage points greater than the land ratio Lc of the central region 3 in order to stabilize transient characteristic during cornering with a small camber angle.

For example, each land ratio Ls of each shoulder region 5 is greater than the land ratio Lc of the central region 3 and the land ratio Lm of the middle region 4. Preferably, the land ratio Ls of the shoulder region 5 is 8 to 11 percentage point greater than the land ratio Lc of the central region 3, and 5 to 7 percentage points greater than the land ratio Lm of the middle region 4.

Figure 8:
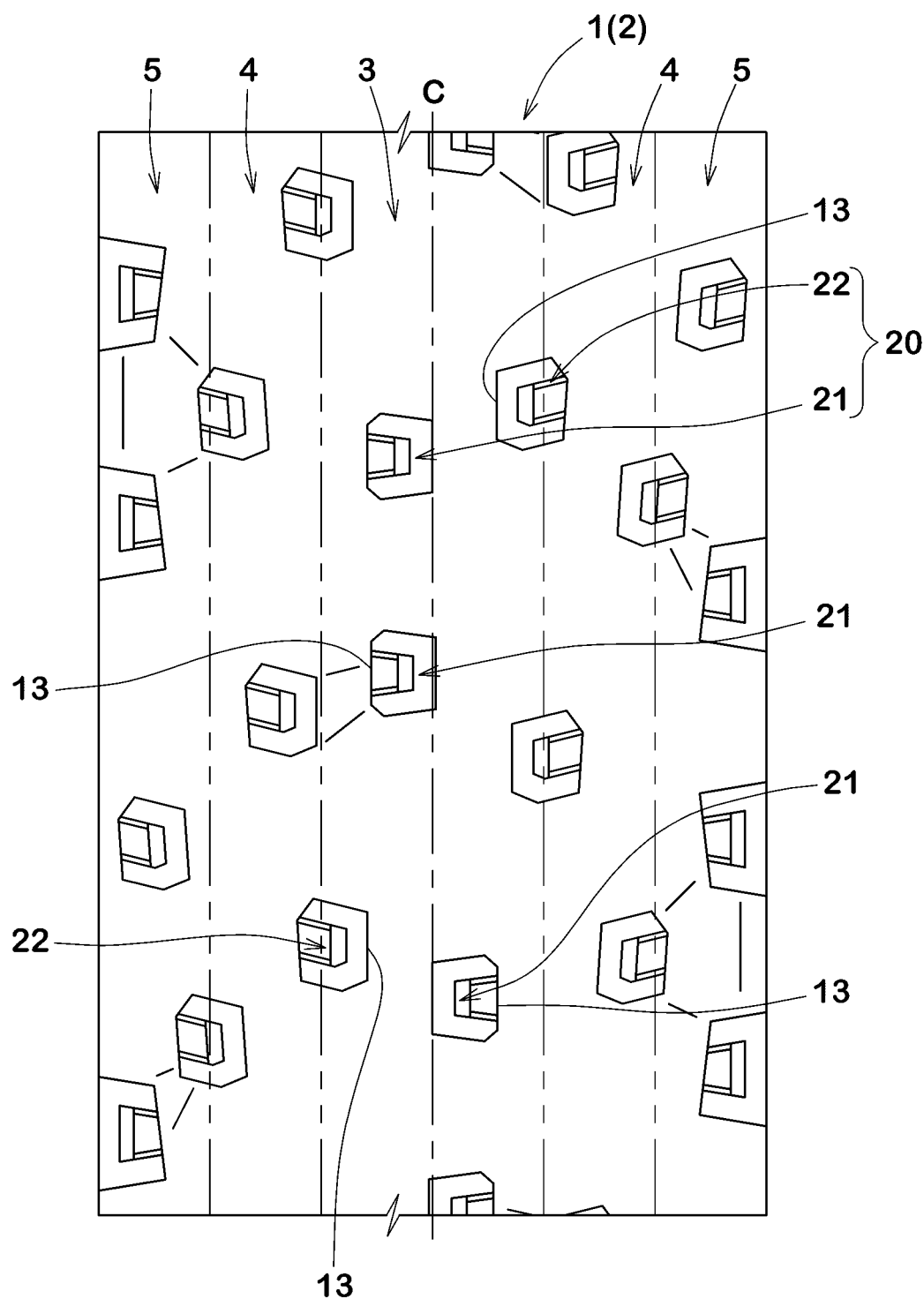
FIG. 8 is a development view of the tread portion of the motorcycle tire for running on rough terrain according to another embodiment of the present invention.

FIG. 8 illustrates a development view of the tread portion 2 of the motorcycle tire 1 for running on rough terrain according to another embodiment of the present invention. In this embodiment, one of the first central blocks 21 overlaps with one of the second central blocks 22 one another when these blocks 21 and 22 are projected on a tire meridian cross section by the respective sidewalls 13 as illustrated in FIG. 3A. Such a block arrangement may allow the first central blocks 21 to bite into a soft mud terrain.

While the particularly preferable embodiments in accordance with the present invention have been described in detail, the present invention is not limited to the illustrated embodiments, but can be modified and carried out in various aspects.

EXAMPLE

Motorcycle tires for rough terrain with a basic tread pattern shown in FIG. 1 or FIG. 8 were manufactured, as a front wheel, based on details shown in Table 1. Furthermore, as a comparative example, motorcycle tires for rough terrain with a basic tread pattern shown in FIGS. 9 to 11 were manufactured, as a front wheel, based on details shown in Table 1. Then, transient characteristic during cornering and grip performance on hard and soft terrain was tested for each tire. Common specifications of the tires and the test method are as follows.

Motorcycle: Racing motorcycle for motocross with a displacement of 450 cc
Tire size: 80/100-21
Rime size: 1.60×21
Internal pressure: 80 kPa Transient Characteristic During Cornering Test:

A test run was carried out on a motocross course and then a rider evaluated the transient characteristic during cornering by his feeling. Here, the transient characteristic during cornering is a linearity of change of the cornering feeling according to change of camber angle. The test results are shown in Table 1 using a score where Ref 1 is set to 100. The larger the value, the better the transient characteristic is.

Grip Performance on Hard and Soft Terrain Test:

A test run was carried out on hard terrain having a compressed soil thereon and a soft mud terrain, and then a rider evaluated the grip performance by his feeling. The test results are shown in Table 1 using a score where Ref 1 is set to 100. The larger the value, the better the performance is.

From the test results shown in Table 1, it has been confirmed that the example tires has excellent transient characteristic during cornering as well as grip performance on both of hard and soft terrain.

TABLE 1

Figure 9:
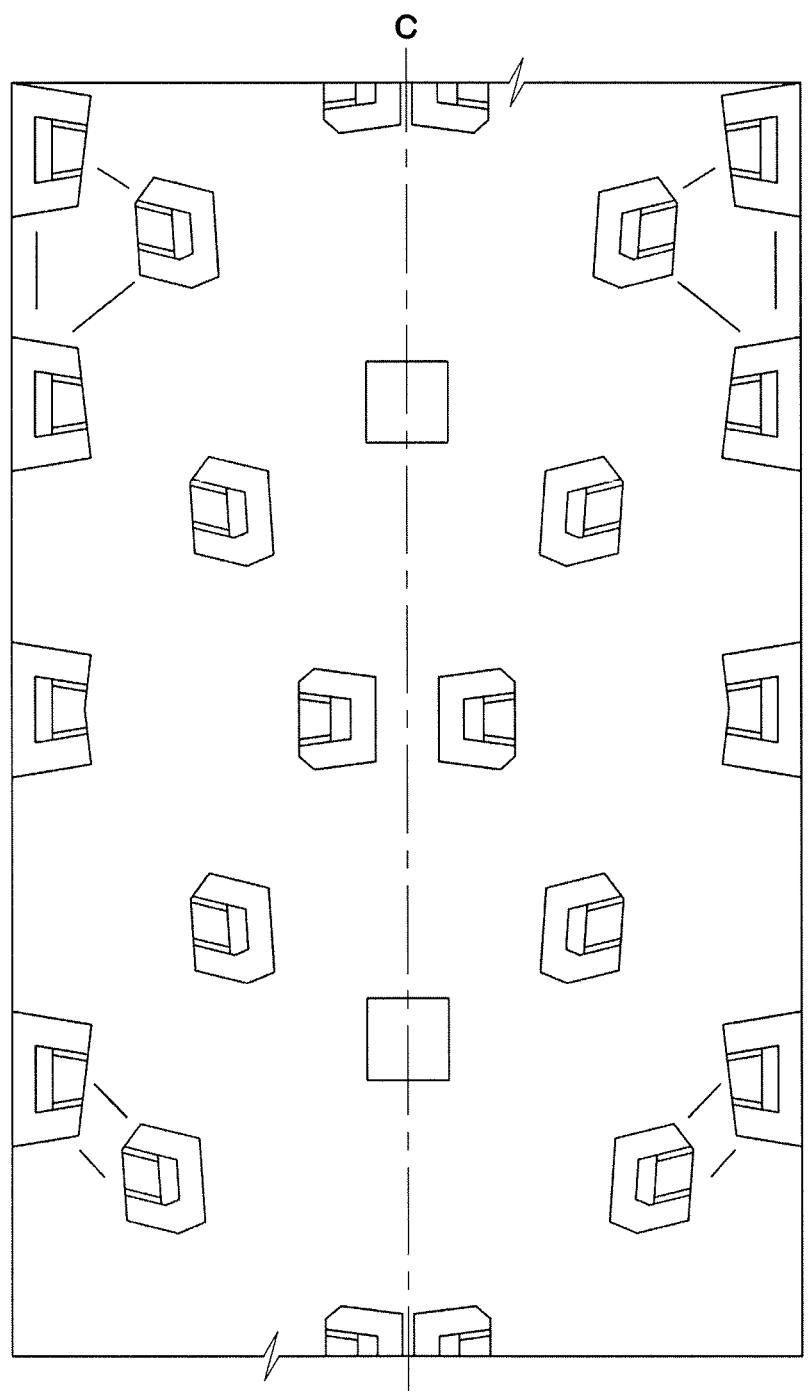
FIGS. 9, 10 and 11 are development views of tread portions of motorcycle tires for running on rough terrain according to comparative examples.
Figure 10:
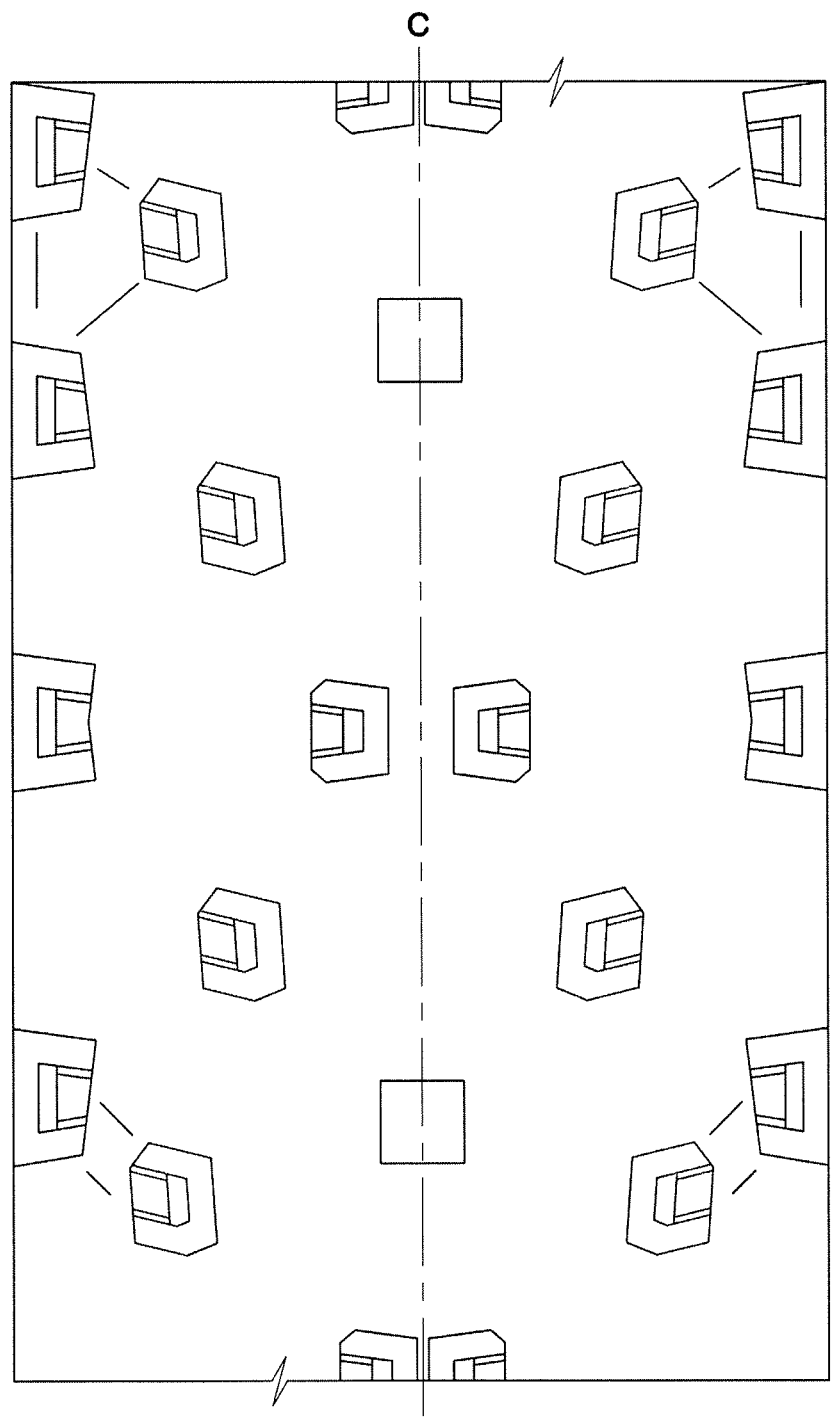
Figure 11:
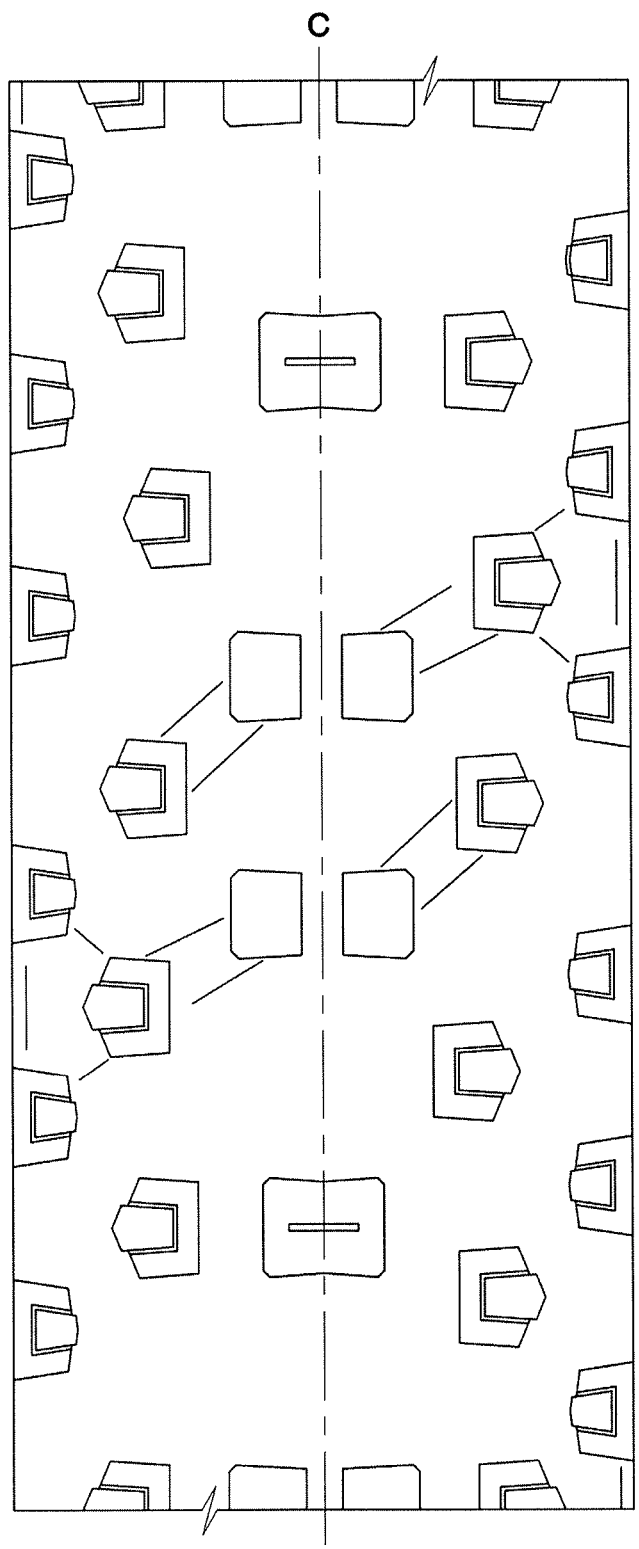

|  | Ref. 1 | Ref. 2 | Ref. 3 | Ref. 4 | Ref. 5 | Ex. 1 | Ex. 2 | Ex. 3 |
| --- | --- | --- | --- | --- | --- | --- | --- | --- |
| Tread pattern | FIG. 9 | FIG. 9 | FIG. 10 | FIG. 10 | FIG. 11 | FIG. 1 | FIG. 1 | FIG. 1 |
| Tread portion land ratio Lt (%) | 17 | 19 | 17 | 19 | 22 | 17 | 14 | 21 |
| Central region land ratio Lc (%) | 12 | 14 | 12 | 14 | 20 | 13 | 11 | 15 |
| Middle region land ratio Lm (%) | 16 | 19 | 16 | 19 | 22 | 16 | 13 | 20 |
| Shoulder region land ratio Ls (%) | 23 | 24 | 23 | 24 | 23 | 23 | 19 | 26 |
| Ratio L1/Lp | 0.25 | 0.25 | 0.3 | 0.3 | 0.11 | 0.3 | 0.3 | 0.3 |
| Triangular block arrangement | Presence | Presence | Presence | Presence | Presence | Presence | Presence | Presence |
| Dented shoulder block | Presence | Presence | Presence | Presence | Presence | Presence | Presence | Presence |
| Transient characteristic during cornering (Score) | 100 | 101 | 102 | 100 | 100 | 110 | 108 | 111 |
| Grip performance on hard terrain (Score) | 100 | 103 | 102 | 103 | 100 | 105 | 100 | 106 |
| Grip performance on soft terrain (Score) | 100 | 100 | 102 | 102 | 102 | 105 | 107 | 101 |

|  | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 |
| Tread portion land ratio Lt (%) | 17 | 17 | 17 | 17 | 17 | 17 | 17 | 17 |
| Central region land ratio Lc (%) | 11 | 15 | 13 | 13 | 13 | 13 | 13 | 13 |
| Middle region land ratio Lm (%) | 16 | 16 | 15 | 18 | 16 | 16 | 16 | 16 |
| Shoulder region land ratio Ls (%) | 23 | 23 | 23 | 23 | 21 | 24 | 23 | 23 |

TABLE 1-continued

|  |  |  |  |  |  |  |  |  |
|---|---|---|---|---|---|---|---|---|
| Ratio L1/Lp | 0.3 | 0.3 | 0.3 | 0.3 | 0.3 | 0.3 | 0.25 | 0.35 |
| Triangular block arrangement | Presence | Presence | Presence | Presence | Presence | Presence | Presence | Presence |
| Dented shoulder block | Presence | Presence | Presence | Presence | Presence | Presence | Presence | Presence |
| Transient characteristic during cornering (Score) | 107 | 108 | 110 | 110 | 109 | 111 | 110 | 110 |
| Grip performance on hard terrain (Score) | 103 | 105 | 104 | 105 | 104 | 106 | 105 | 104 |
| Grip performance on soft terrain (Score) | 103 | 104 | 105 | 104 | 105 | 102 | 103 | 106 |

|  | Ex. 12 | Ex. 13 | Ex. 14 | Ex. 15 | Ex. 16 | Ex. 17 | Ex. 18 | Ex. 19 |
|---|---|---|---|---|---|---|---|---|
| Tread pattern | FIG. 1 | FIG. 1 | FIG. 1 | FIG. 1 | FIG. 1 | FIG. 1 | FIG. 8 | FIG. 8 |
| Tread portion land ratio Lt (%) | 17 | 16 | 19 | 17 | 17 | 19 | 17 | 19 |
| Central region land ratio Lc (%) | 13 | 12 | 14 | 13 | 13 | 16 | 13 | 14 |
| Middle region land ratio Lm (%) | 16 | 15 | 19 | 18 | 15 | 18 | 16 | 19 |
| Shoulder region land ratio Ls (%) | 23 | 21 | 24 | 19 | 22 | 23 | 23 | 24 |
| Ratio L1/Lp | 0.4 | 0.3 | 0.3 | 0.3 | 0.3 | 0.3 | 0.3 | 0.3 |
| Triangular block arrangement | Presence | Presence | Presence | Presence | Presence | Presence | Presence | Presence |
| Dented shoulder block | Presence | Presence | Presence | Presence | Presence | Presence | Presence | Presence |
| Transient characteristic during cornering (Score) | 110 | 107 | 110 | 109 | 108 | 109 | 108 | 108 |
| Grip performance on hard terrain (Score) | 102 | 103 | 106 | 104 | 103 | 106 | 100 | 100 |
| Grip performance on soft terrain (Score) | 106 | 103 | 103 | 106 | 105 | 103 | 106 | 104 |

|  | Ex. 20 | Ex. 21 | Ex. 22 | Ex. 23 | Ex. 24 |
|---|---|---|---|---|---|
| Tread pattern | FIG. 8 | FIG. 8 | FIG. 1 | FIG. 1 | FIG. 1 |
| Tread portion land ratio Lt (%) | 14 | 21 | 17 | 17 | 17 |
| Central region land ratio Lc (%) | 11 | 15 | 13 | 13 | 13 |
| Middle region land ratio Lm (%) | 13 | 20 | 16 | 16 | 16 |
| Shoulder region land ratio Ls (%) | 19 | 26 | 23 | 23 | 23 |
| Ratio L1/Lp | 0.3 | 0.3 | 0.3 | 0.3 | 0.3 |
| Triangular block arrangement | Presence | Presence | None | Presence | None |
| Dented shoulder block | Presence | Presence | Presence | None | None |
| Transient characteristic during cornering (Score) | 107 | 108 | 107 | 107 | 106 |
| Grip performance on hard terrain (Score) | 98 | 101 | 105 | 105 | 104 |
| Grip performance on soft terrain (Score) | 107 | 103 | 103 | 103 | 102 |

What is claimed is:

1. A motorcycle tire for running on rough terrain, the tire comprising
a tread portion comprising a central region having a development width of one third of a tread development width,
a pair of shoulder regions each having a development width of one sixth of the tread development width from each tread edge, and
a middle region defined between the central region and one of the shoulder regions on each side of a tire equator,
wherein:
the tread portion is provided with
(a) at least one central block having a ground contact face whose centroid is located within the central region,
(b) at least one middle block having a ground contact face whose centroid is located within the middle region on each side of the tire equator, and
(c) at least one shoulder block having a ground contact face whose centroid is located within the shoulder region on each side of the tire equator, said at least one shoulder block comprising a dented shoulder block in which the entirety of its axially inner sidewall including an axially inner circumferential edge of the ground contact surface thereof is concave, said at least one shoulder block comprising an outer shoulder block forming one of the tread edges and an inner shoulder block which partially overlaps both of the outer shoulder block and the middle block on the tire meridian cross section, an overlap amount between the inner shoulder block and the outer shoulder block being greater than an overlap amount between the inner shoulder block and the middle block; and wherein when the respective blocks are projected onto a tire meridian cross section along a circumferential direction of the tire, every pair of axially adjacent two blocks are arranged so as to overlap one another at least partially on the tire meridian cross section, the tread portion comprises a triangular arrangement of blocks which comprises two outer shoulder blocks arranged separately in the circumferential direction of the tire to form a circumferential gap therebetween, the middle block being arranged axially inward of the gap, and each outer shoulder block having an axial width gradually decreasing toward the gap, and tie-bars are provided, arranged in a triangular manner to connect the triangular arrangement of blocks.

2. The motorcycle tire according to claim 1, wherein
the adjacent two blocks on the tire meridian cross section are arranged so as to overlap one another at least partially at the respective ground contact faces.

3. The motorcycle tire according to claim 1, wherein
the outer shoulder block has the ground contact face having a circumferential length gradually decreasing axially inwardly.

4. The motorcycle tire according to claim 2, wherein
the outer shoulder block has the ground contact face having a circumferential length gradually decreasing axially inwardly.

5. The motorcycle tire according to claim 1, wherein:
(i) a land ratio of the central region of the tread portion is in a range of from 11% to 15%;
(ii) each land ratio of each middle region of the tread portion is 2 to 5 percentage points greater than the land ratio of the central region; and
(iii) each land ratio of each shoulder region of the tread portion is 8 to 11 percentage point greater than the land ratio of the central region and 5 to 7 percentage points greater than the land ratio of each middle region.

6. The motorcycle tire according to claim 1, wherein
a land ratio of the entire tread portion is in a range of from 14% to 21%.

7. The motorcycle tire according to claim 5, wherein
a land ratio of the entire tread portion is in a range of from 14% to 21%.

8. The motorcycle tire according to claim 1, wherein
the axially inner circumferential edge of the dented shoulder block extends in a lateral V-shaped manner.

* * * * *